United States Patent
Bouvigne

(10) Patent No.: US 10,547,662 B2
(45) Date of Patent: Jan. 28, 2020

(54) BITRATE STREAM SELECTION FOR DOWNLOADING VIDEO CONTENT TO A CLIENT DEVICE

(71) Applicant: Cisco Technology, Inc., San Jose, CA (US)

(72) Inventor: Gabriel Bouvigne, Nanterre (FR)

(73) Assignee: Cisco Technology, Inc., San Jose, CA (US)

( * ) Notice: Subject to any disclaimer, the term of this patent is extended or adjusted under 35 U.S.C. 154(b) by 208 days.

(21) Appl. No.: 15/679,187

(22) Filed: Aug. 17, 2017

(65) Prior Publication Data

US 2019/0058750 A1  Feb. 21, 2019

(51) Int. Cl.
| | | |
|---|---|---|
| G06F 15/16 | (2006.01) | |
| H04L 29/06 | (2006.01) | |
| H04N 19/115 | (2014.01) | |
| H04N 21/234 | (2011.01) | |
| H04N 19/152 | (2014.01) | |
| H04N 19/184 | (2014.01) | |

(Continued)

(52) U.S. Cl.
CPC ............ *H04L 65/80* (2013.01); *H04L 65/608* (2013.01); *H04N 19/115* (2014.11); *H04N 19/147* (2014.11); *H04N 19/152* (2014.11); *H04N 19/184* (2014.11); *H04N 21/23406* (2013.01); *H04N 21/23439* (2013.01)

(58) Field of Classification Search
CPC ... H04L 65/80; H04L 65/608; H04L 65/4084; H04L 65/4092
USPC ................. 709/202–203, 217–219, 227–228
See application file for complete search history.

(56) References Cited

U.S. PATENT DOCUMENTS

| | | | |
|---|---|---|---|
| 10,178,043 B1* | 1/2019 | Ganjam | .............. H04L 65/4084 |
| 2012/0331106 A1* | 12/2012 | Ramamurthy | .............................. H04N 21/234327 709/218 |

(Continued)

FOREIGN PATENT DOCUMENTS

WO  2016/123497  8/2016

OTHER PUBLICATIONS

Hakkarainen, Aki, et al.; "High-Efficiency Device Localization in 5G Ultra-Dense Networks: Prospects and Enabling Technologies." Tampere University of Technology [viewed 2017] at: http://www.tut.fi/5G/VTC15/TUT_5G-POS_VTC15_slides.pdf.

(Continued)

*Primary Examiner* — Bharat Barot

(57) ABSTRACT

In one embodiment, an apparatus includes a processor operative to determine a plurality of bitrate options for downloading video content to a client device and rendering by the client device over future successive timeslots, the video content being encoded as a plurality of bitrate streams, each one bitrate stream being encoded at a different bitrate and being associated with a media distortion value, each one bitrate option including a different selection from the bitrate streams for rendering by the client device over the timeslots so that the bitrate options include different combinations of the bitrate streams for rendering by the client device over the timeslots, and select one bitrate option, from the bitrate options yielding a selected bitrate option, to provide a lowest media distortion result across the timeslots, or a lowest media distortion result across the timeslots subject to at least one other constraint.

20 Claims, 8 Drawing Sheets

(51) Int. Cl.
*H04N 21/2343* (2011.01)
*H04N 19/147* (2014.01)

(56) References Cited

U.S. PATENT DOCUMENTS

| | | | | |
|---|---|---|---|---|
| 2015/0032851 | A1* | 1/2015 | Lieber | H04L 65/608 709/219 |
| 2015/0264596 | A1 | 9/2015 | Franklin et al. | |
| 2016/0234078 | A1 | 8/2016 | Jana et al. | |
| 2017/0366833 | A1* | 12/2017 | Amidei | H04L 65/4092 |

OTHER PUBLICATIONS

Hao, Jia et al.; "GTube: geo-predictive video streaming over HTTP in mobile environments" in Proceedings of the 5th ACM Multimedia Systems Conference (MMSys '14). ACM, New York, NY, USA.

Karagiannis, Georgios et al.; "Mobility and bandwidth prediction in virtualized LTE systems: Architecture and challenges," 2014 European Conference on Networks and Communications (EuCNC), Bologna, 2014, pp. 1-5.

Karimzadeh, Morteza et al.; "Mobility and bandwidth prediction as a service in virtualized LTE systems," 2015 IEEE 4th International Conference on Cloud Networking (CloudNet), Niagara Falls, ON, 2015, pp. 132-138.

Nadembega, Apollinaire et al.; "A Framework for Mobility Prediction and High Bandwidth Utilization to Support Mobile Multimedia Streaming"; 2013 IEEE International Conference on Advanced Networks and Telecommunications Systems (ANTS), Kattankulathur, 2013, pp. 1-6.

Qin, Yanyuan et al.; "A Control Theoretic Approach to ABR Video Streaming: A Fresh Look at PID-based Rate Adaptation"; IEEE INFOCOM 2017.

Riiser, Haakon et al.; "Video streaming using a location-based bandwidth-lookup service for bitrate planning"; ACM Transactions on Multimedia Computing Communications and Applications; 2011.

Szilagyi, Péter et al.; "Mobile Content Delivery Optimization based on Throughput Guidance"; IETF 93, IRTF ICCRG, Prague, Jul. 22, 2015; available on the web at: https://www.ietf.org/proceedings/93/slides/slides-93-iccrg-3.pdf.

Trammell, B. et al.; "Path Layer UDP Substrate Specification" (draft-trammell-plus-spec-01); Network Working Group; Internet-Draft available on the web at: https://datatracker.ietf.org/wg/plus/about/.

Van Winsen, Stijn; "Survey on Bandwidth Availability Prediction Models for LTE Networks." (2013). 19th Twente Student Conference on IT, Jun. 2013. University of Twente, Netherlands.

Zou, Xuan Kelvin et al.; "Can Accurate Predictions Improve Video Streaming in Cellular Networks?"; in Proceedings of the 16th International Workshop on Mobile Computing Systems and Applications (HotMobile '15). ACM. New York, NY, USA, 57-62.

* cited by examiner

Fig. 4

| | DISTORTION VALUE (TIMESLOT 1) | DISTORTION VALUE (TIMESLOT 2) | DISTORTION VALUE (TIMESLOT 3) | SUM OF ABSOLUTE DIFFERENCES | SUM OF SQUARED DIFFERENCES |
|---|---|---|---|---|---|
| OPTION 1 | 2 | 1 | 2 | 5 | 9 |
| OPTION 2 | 2 | 2 | 1 | 5 | 9 |
| OPTION 3 | 0 | 1 | 3 | 4 | 10 |
| OPTION 4 | 2 | 2 | 2 | 6 | 12 |
| OPTION 5 | 0 | 0 | 3 | 3 | 9 |

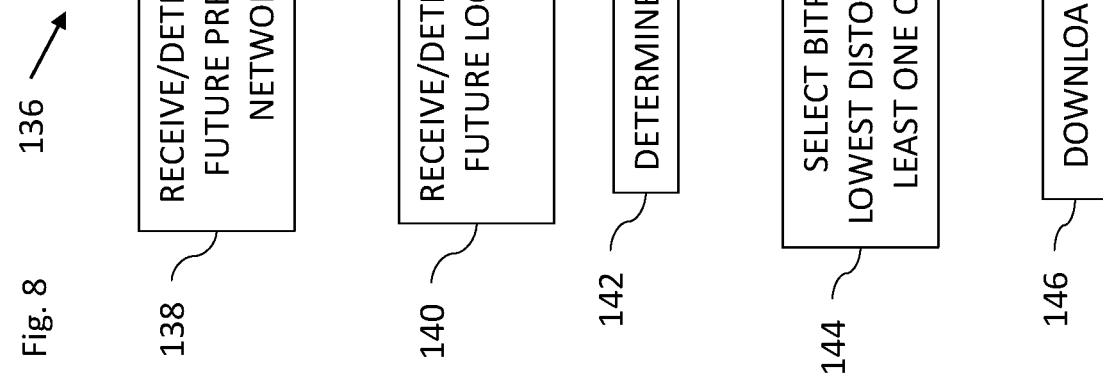
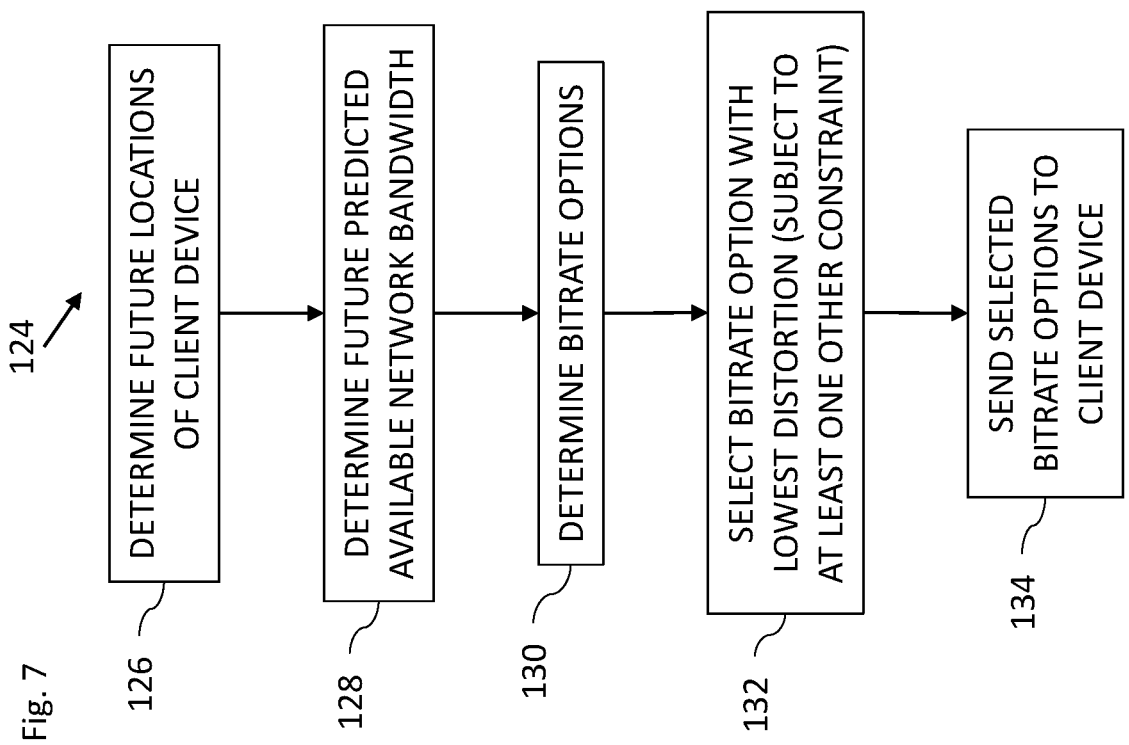

US 10,547,662 B2

BITRATE STREAM SELECTION FOR DOWNLOADING VIDEO CONTENT TO A CLIENT DEVICE

TECHNICAL FIELD

The present disclosure generally relates to bitrate stream selection based on predicted future available network bandwidth.

BACKGROUND

The bandwidth available to a client device in a network may change based on the location of the client device, a time of day and/or the number of devices connected to the network via a same base station as the client device. In 5th generation (5G) wireless systems, an increased number of base stations of reduced range may likely increase the rate of bandwidth change for client devices.

BRIEF DESCRIPTION OF THE DRAWINGS

The present disclosure will be understood and appreciated more fully from the following detailed description, taken in conjunction with the drawings in which:

FIG. 4 is a chart illustrating selection of exemplary bitrate options for use in the system of FIG. 1;

FIG. 7 is a flow chart showing exemplary steps in a method of bitrate stream selection in the system of FIG. 1;

FIG. 8 is a flow chart showing exemplary steps in an alternative method of bitrate stream selection in the system of FIG. 1.

DESCRIPTION OF EXAMPLE EMBODIMENTS

Overview

There is provided in accordance with an embodiment of the present disclosure, an apparatus including a processor, and a memory to store data used by the processor, wherein the processor is operative to determine a plurality of bitrate options for downloading video content to a client device and rendering by the client device over a plurality of future successive timeslots, the video content being encoded as a plurality of bitrate streams, each one bitrate stream of the plurality of bitrate streams being encoded at a different bitrate and being associated with a media distortion value, each one bitrate option of the plurality of bitrate options including a different selection from the plurality of bitrate streams for rendering by the client device over the plurality of future successive timeslots so that the plurality of bitrate options include different combinations of the plurality of bitrate streams for rendering by the client device over the plurality of future successive timeslots, each one bitrate option of the plurality of bitrate options selecting one bitrate stream from the plurality of bitrate streams for rendering by the client device in each of the plurality of future successive timeslots such that two or more adjacent timeslots of the plurality of future successive timeslots includes a same one bitrate stream or different bitrate streams from the plurality of bitrate streams for rendering by the client device, at least one bitrate option of the plurality of bitrate options including a selection of different bitrate streams from the plurality of bitrate streams for rendering by the client device, and select one bitrate option, from the plurality of bitrate options yielding a selected bitrate option, to provide a lowest media distortion result across the plurality of future successive timeslots, or a lowest media distortion result across the plurality of future successive timeslots subject to at least one other constraint.

DETAILED DESCRIPTION

Figure 1:
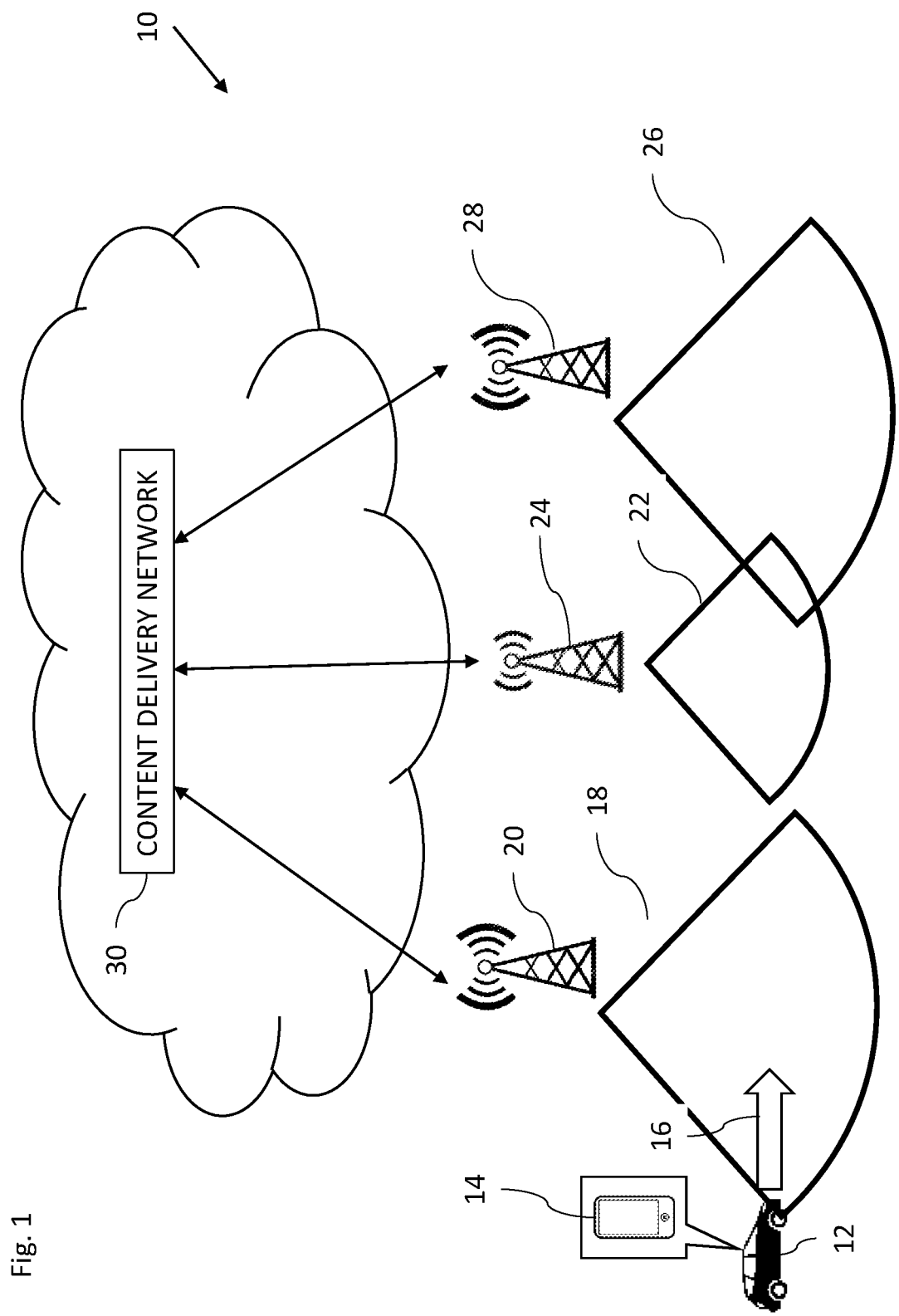
FIG. 1 is a partly pictorial, partly block diagram view of a media delivery system constructed and operative in accordance with an embodiment of the present disclosure.

Reference is now made to FIG. 1, which is a partly pictorial, partly block diagram view of a media delivery system 10 constructed and operative in accordance with an embodiment of the present disclosure. By way of introduction, in adaptive bitrate (ABR) video playback in which several quality streams are available, client devices select an appropriate quality stream (also known as bitrate stream) based on available network bandwidth. While ABR generally works correctly for stationary devices where bandwidth in the last mile does not change so much, with mobile client devices where available network bandwidth may vary significantly, ABR may not be the best strategy. For example, a user of a mobile device may move into an area in which the base station of that area does not provide enough bandwidth, even for the lowest video quality stream. This problem may become more pronounced in a 5G environment with an increased number of base stations of reduced range. Stationary devices may also be adversely affected if they are situated in areas of changeable bandwidth.

The media delivery system 10 is operative to use future available network bandwidth estimates to select available bitrate streams in order to provide a better media rendering experience as will be described below in more detail. First, a description of current available network bandwidth and predicted future available network bandwidth is given in the following sentences. FIG. 1 shows a car 12, which includes a client device 14 receiving media content from a content delivery network (CDN) 30. The network bandwidth, which is currently available to the client device 14, may depend on the various possible radio links (e.g., via a 4th generation (4G) wireless system or 5G or wireless local area networking) providing connectivity in the location of the client device 14 and may depend on device capabilities. Upcoming available bandwidth per possible radio link in the current location may be estimated based on the mobility of other subscribers in the network. For example, a bus or train approaching the client device 14 may result in the bus or train passengers taking a significant portion of the overall available bandwidth in the current location of the client device 14. It will be appreciated that predictive localization may be used to predict future locations of client devices. Upcoming available bandwidth, per possible radio link, in a predicted upcoming location of the client device 14 may also be estimated based on the current available bandwidth in the predicted upcoming location and the mobility of other subscribers in the network.

In the example of FIG. 1, the car 12 is travelling in the direction shown by an arrow 16 through a region 18 which is provided with network connectivity by a radio link 20, then through a region 22 which is provided with network connectivity by a radio link 24, and then through a region 26 which is provided with network connectivity by a radio link 28. The future locations of the client device 14 and the timing of when the client device 14 is in each of the future locations may be predicted based on a current speed and direction of the client device 14, which is in the car 12, as well as other factors, which may include known routes and traffic predictions, by way of example only. The available network bandwidth in the regions 18, 22, 26 may then be estimated for the times that the client device 14 is predicted to be in the respective regions 18, 22, 26.

It was mentioned above that the media delivery system 10 is operative to use future available network bandwidth estimates to select available bitrate streams in order to provide a better media rendering experience. The bitrate stream selection may be performed either by the client device 14 or by any suitable server in communication with the client device 14. The following are non-limiting examples of bitrate stream selection in the media delivery system 10.

A video player of the client device 14 is currently buffering a highest quality layer (highest bitrate stream) of the media content in the region 18 served by the radio link 20. If the next region 22, served by the radio link 24, does not provide enough bandwidth for a lowest quality layer (lowest bitrate stream) of the media content, and a media buffer of the client device 14 is not big enough to feed the playback until the user reaches the following region 26 served by the radio link 28, which has higher predicted available bandwidth, then the video player of the client device 14 may be operative to adjust its buffering strategy in order to proactively switch to buffering the lowest quality layer in the region 18 in order to have enough video time in the buffer until the client device 14 reaches the region 26.

If the next region 22, served by the radio link 24, only provides enough bandwidth for the lowest quality layer (lowest bitrate stream) of the media content but the media buffer of the client device 14 is big enough to feed the playback at the highest bitrate stream until the user reaches the following region 26 served by the radio link 28, then the video player of the client device 14 may be operative to adjust its buffering strategy to buffering the highest quality layer in the region 18 (possibly at faster than real-time) and in the region 22 (slower than real-time because the available bandwidth in the region 22 is not high enough to buffer the highest quality layer at real-time speed).

It will be appreciated that there may be many different buffering options, each option selecting a different combination of bitrate streams buffered at different speeds (less than real-time, real-time and more than real-time) in order to provide a better media rendering experience. Generation of the different options and selecting which of the options to use is discussed in more detail below with reference to FIGS. 2-9.

Figure 2:
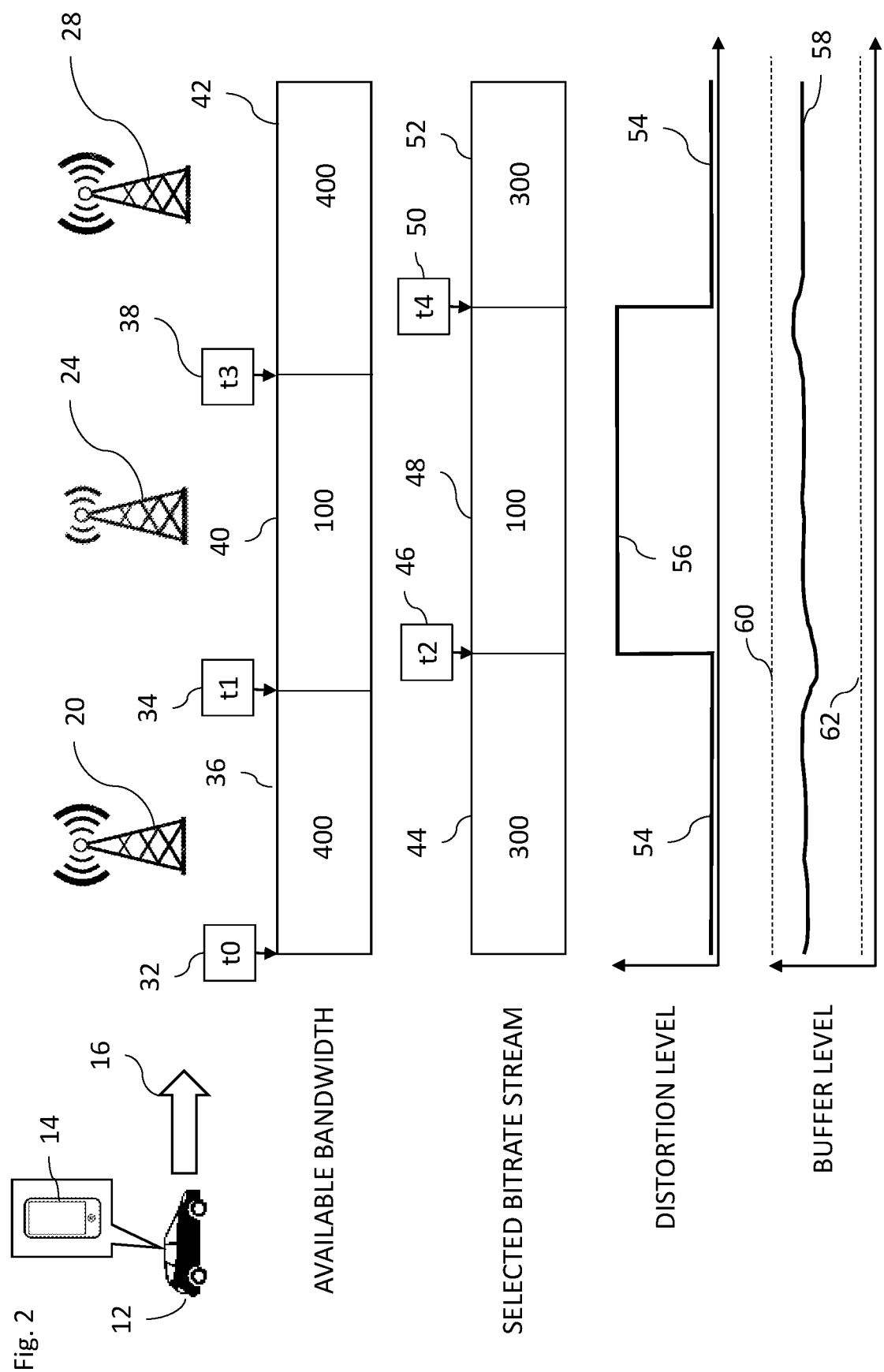
FIG. 2 is a pictorial illustration of a first example of adaptive bitrate selection for use in the system of FIG. 1.

Reference is now made to FIG. 2, which is a pictorial illustration of a first example of adaptive bitrate selection for use in the system 10 of FIG. 1. The example shown in FIG. 2 generally follows the ABR scheme whereby the video player of the client device 14 adjusts the buffering strategy according to the current available bandwidth without taking into account future available bandwidth.

FIG. 2 shows that between a time t0 (block 32) and a time t1 (block 34), the available network bandwidth from the radio link 20 is 400 kilobit per second (kbps) (block 36). From the time t1 (block 34) until a time t3 (block 38), the available network bandwidth from the radio link 24 is 100 kbps (block 40). After the time t3 (block 38), the available network bandwidth from the radio link 28 is 400 kbps (block 42).

The client device 14 first selects a 300 kbps bitrate stream (block 44) for buffering at time t0 (block 32) and then at a time t2 (block 46) the client device 14 switches to buffering a lower bitrate stream of 100 kbps (block 48) due to the drop in bandwidth at time t1 (block 34). It should be noted that there might be a delay between time t1 and t2 while the client device 14 adjusts its buffering strategy. Then at a time t4 (block 50), the client device 14 switches to buffering the 300 kbps bitrate stream again (block 52) as the available network bandwidth has increased at time t3 (block 38). It should be noted that there might be a delay between time t3 and t4 while the client device 14 adjusts its buffering strategy.

It will be appreciated that a higher bitrate stream is associated with less media distortion than a lower bitrate stream. FIG. 2 shows that media distortion is lowest (lines 54) during the rendering of the 300 kbps bitrate stream and highest (line 56) during the rendering of the 100 kbps bitrate stream. Media distortion may refer to video distortion and/or audio distortion. Media distortion may be determined with respect to a reference quality level, e.g. a quality level of the highest bitrate stream or the quality level of uncompressed video. The media distortion values of the different bitrate streams may be provided by the content provider, or may be estimated based on the bitrates associated with the bitrate streams, or may be roughly approximated or assigned in an arbitrary fashion. For example, a bitrate stream of 300 kbps may be associated with a media distortion of 0, a bitrate stream of 200 kbps may be associated with a media distortion of 1, and a bitrate stream of 100 kbps may be associated with a media distortion of 2, and so on.

The buffer level is shown by a line 58. The buffer level is fairly steady with small variations in the buffer level at the times the bitrate streams are switched to different levels. It will be noted that a maximum buffer level 60 and a minimum buffer level 62 are not exceeded during the rendering of the content item.

Figure 3:
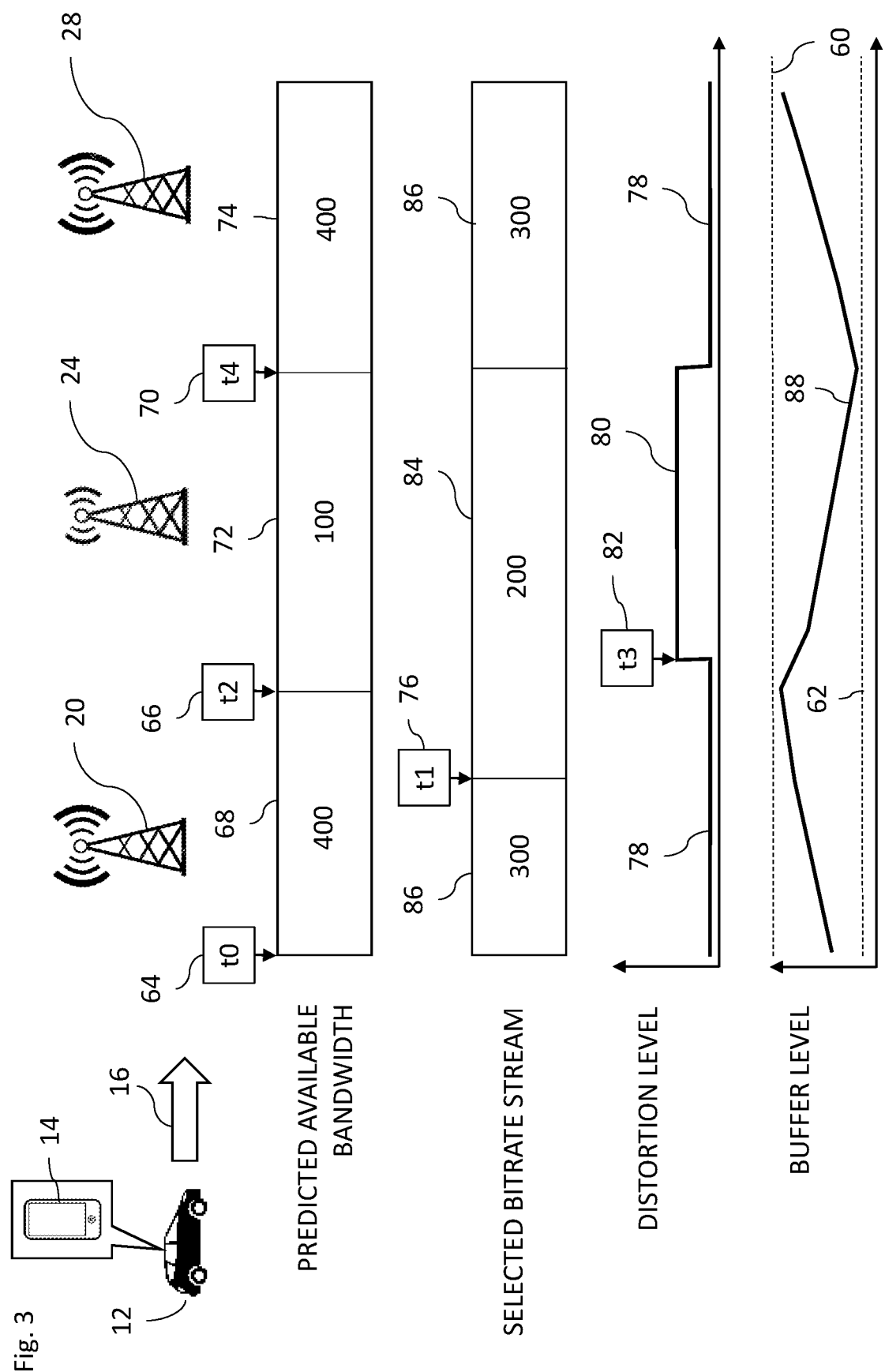
FIG. 3 is a pictorial illustration of a second example of adaptive bitrate selection for use in the system of FIG. 1.

Reference is now made to FIG. 3, which is a pictorial illustration of a second example of adaptive bitrate selection for use in the system 10 of FIG. 1. In the example shown in FIG. 3, the video player of the client device 14 adjusts the buffering strategy according to the predicted future available bandwidth as will now be explained.

FIG. 3 shows that between a time t0 (block 64) and a time t2 (block 66), the predicted available network bandwidth from the radio link 20 is 400 kilobit per second (kbps) (block 68). From the time t2 (block 66) until a time t4 (block 70), the predicted available network bandwidth from the radio link 24 is 100 kbps (block 72). After the time t4 (block 70), the predicted available network bandwidth from the radio link 28 is 400 kbps (block 74).

Although, the predicted available bandwidth between the time t2 (block 66) and the time t4 (block 70) is only sufficient for buffering a 100 kbps stream at real-time speed, a higher rate stream, e.g. 200 kbps, (block 84) may be buffered at less than real-time speed. Additionally, there is spare bandwidth between the time t0 (block 64) and the time t2 (block 66). During this time a 300 kbps stream (block 86) may be buffered at faster than real-time speed until a time t1 (block 76) and then the 200 kbps stream (block 84) may be buffered faster than real-time speed until the time t2 (block 66).

The 300 kbps buffered stream is rendered from the time t0 (block 64) until a time t3 (block 82). The 200 kbps buffered stream is rendered from the time t3 (block 82) until the time t4 (block 70). The 300 kbps stream is again rendered from the time t4 (block 70). The distortion is shown as having a lowest value when the 300 kbps stream is being rendered, illustrated by lines 78. The distortion is shown as being a higher value when the 200 kbps stream is being rendered, illustrated by a line 80. However, it will be noted that the variation in distortion in the example of FIG. 3 is less than the variation in distortion in the example of FIG. 2. Additionally, the overall media distortion in the example of FIG. 3 is less than the media overall distortion in the example of FIG. 2.

FIG. 3 shows that the buffer level (a line 88), although above the minimum buffer level 62 and less than the maximum buffer level 60 throughout the buffering and rendering, rises close to the maximum buffer level 60 and falls close to the minimum buffer level 62 at certain times. It will be appreciated that in this example, there is not enough buffer room to buffer the 300 kbps stream throughout and therefore the 200 kbps stream was selected in order to maximize buffer usage, bandwidth usage and at the same time provide a lower overall distortion and a lower variation in distortion than in the example of FIG. 2.

Reference is now made to FIG. 4, which is a chart 90 illustrating selection of exemplary bitrate options for use in the system 10 of FIG. 1. As mentioned above, there may be many different buffering options (also referred to herein as bitrate options) in a content download scenario. Each option selects a different combination of bitrate streams and may be buffered at different speeds (less than real-time, real-time and more than real-time). It will be appreciated that in order to perform buffering optimization, bitrate streams are selected based on predicted future available network bandwidth and the possible video quality layers (bitrate streams) while avoiding an empty buffer and buffer overflow. Each buffering option may be associated with one or more media distortion levels associated with rendering the selected bitrate streams. Once the different bitrate options have been selected, one of the bitrate options is selected based on minimizing distortion subject to at least one other factor as will now be explained in more detail below.

The chart 90 has a plurality of rows 92. Each row 92 provides details of a different bitrate option. The first three columns 94 of the chart 90 provide a media distortion value in each of three successive timeslots (timeslot 1, timeslot 2 and timeslot 3). Each media distortion value provides a value for media distortion in the respective timeslot when the bitrate stream having that distortion value would be rendered by the client device 14 (FIG. 1) if that option is the selected option for rendering by the client device 14. So in the example of option 1, in timeslot 1, a bitrate stream having a media distortion value of 2 would be rendered, in timeslot 2, a bitrate stream having a media distortion value of 1 would be rendered, and in timeslot 3, a bitrate stream having a media distortion value of 2 would be rendered.

A next column 96, provides a result based on a sum of absolute differences (SADs), which is based on summing the distortion values of each timeslot (columns 94) for that option. So for the example of option 1, the sum of absolute differences is equal to the sum of 2, 1, and 2, which yields 5. It should be noted that because each distortion value is a relative value (in relation to a best media distortion quality or in relation to the media distortion quality of the highest bitrate stream), the distortion value is an absolute difference value for use in the calculation of sum of absolute differences. The sum of absolute differences of option 5 provides the lowest sum of absolute differences with a value of 3. However, the variation in distortion between timeslot 2 and timeslot 3 of option 5 represents a large jump in distortion from 0 to 3. Although, the sum of absolute differences may be used to select the bitrate option for buffering and rendering, in some implementations other selection methods may be employed to smooth out variations in distortion.

One such method that attempts to smooth out variations in distortion is sum of squared differences (SSD), which is illustrated in a final column 98 of the chart 90. So for the example of option 1, the sum of squared differences is equal to $2^2+1^2+2^2$, which yields 9. Summing the squares of the distortion values penalizes larger values and attempts to smooth out variations. In the example of FIG. 4, options 1, 2, and 5 provide a lowest sum of squared differences that is equal to 9. In such a case, where two or more options have the same lowest sum of squared differences, a further test may be carried out to select the bitrate option for buffering and rendering from the other bitrate options providing a lowest sum of squared differences. A further test may include selecting the bitrate option with the lowest sum of absolute differences or the lowest standard variation of the media distortion values, by way of example only. Alternatively, where two or more options have the same lowest sum of squared differences, a first bitrate option in the list may be selected from the bitrate options providing a lowest sum of squared differences. Alternatively, one of the bitrate options providing a lowest sum of squared differences may be selected randomly or pseudo-randomly.

The chart 90 includes three timeslots. It will be appreciated that each of the bitrate options may include two timeslots or more than three timeslots over which the SAD and/or SSD are calculated.

Figure 5:
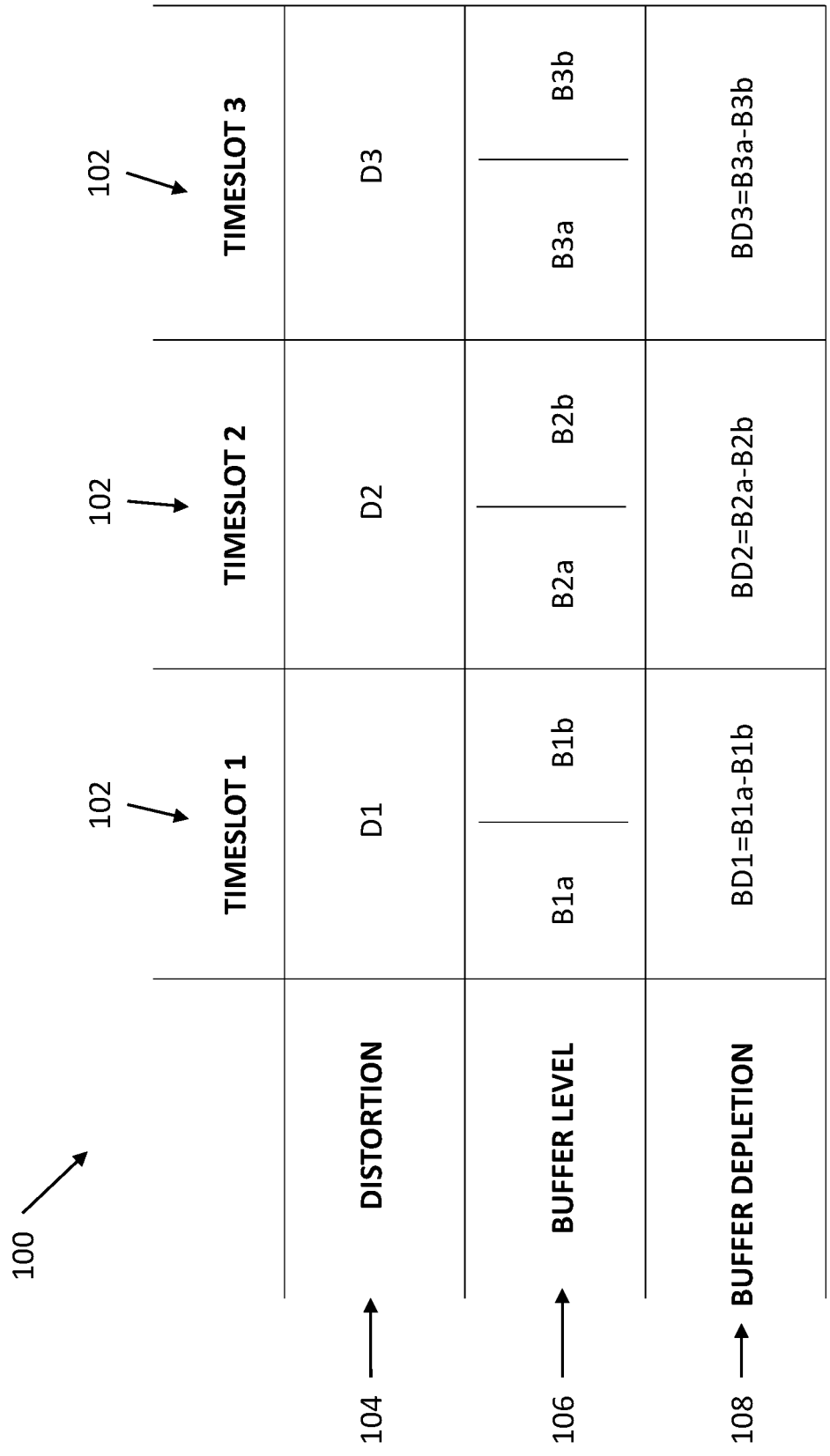
FIG. 5 is a chart further illustrating selection of bitrate options for use in the system of FIG. 1.

Reference is now made to FIG. 5, which is a chart 100 further illustrating selection of bitrate options for use in the system 10 of FIG. 1. The chart 100 includes data for one bitrate option over three timeslots 102. It will be appreciated that three timeslots have been chosen by way of example only and that two or even more than three timeslots may be included in a bitrate option.

A first row 104 of the chart 100 gives data about a media distortion value of the bitrate stream being rendered in each of the timeslots 102. In timeslot 1, the media distortion value is equal to D1. In timeslot 2, the media distortion value is equal to D2. In timeslot 3, the media distortion value is equal to D3. It should be noted that each of the media distortion values provides a value for media distortion relative to the media quality of the highest bitrate stream or an uncompressed media quality, by way of example.

A second row 106 of the chart 100 gives data about the buffer levels of a buffer of the client device 14 (FIG. 1). Each timeslot 102 includes two values about the buffer level. The first value, e.g., B1a in timeslot 1, provides a buffer level value at the beginning of the timeslot. The second value, e.g., B1b in timeslot 1, provides a buffer level value at the end of the timeslot. The buffer level is typically measured in seconds, e.g., how many seconds of video or how many seconds of audio is stored in the buffer. It will be appreciated that any other suitable measure of buffer level may also be used.

A third row 108 of the chart 100 gives data about buffer depletion of the buffer of the client device 14. Buffer depletion is defined as how much the content in the buffer will reduce during a timeslot taking into account content for downloading during the timeslot at the predicted available network bandwidth during the timeslot and content for rendering from the buffer during the timeslot. Buffer depletion is typically measured in seconds, e.g., how many seconds of video or how many seconds of audio is stored in the buffer. In the example of FIG. 5 in timeslot 1, the buffer depletion is equal to B1a-B1b. It will be appreciated that any other suitable measure of buffer depletion may be used. When the buffer level reduces over a timeslot, then buffer depletion is positive, and when the buffer level increases over a timeslot, then the buffer depletion is negative.

Several methods are described below to select the bitrate option having an optimal combination of bitrate streams. Each method includes determining a media distortion result or cost for each of the bitrate options. The bitrate option with the lowest media distortion result or cost is then selected.

As mentioned above with reference to FIG. 4, the SAD method may be used to determine a media distortion result for each of the bit rate options. The bitrate option with the lowest media distortion result is then selected as the bitrate option for rendering. In the example of FIG. 5, the sum of absolute differences gives a media distortion result equal to D1+D2+D3. Another method that could be used is an average, e.g., an average of the values D1+D2+D3 may be used to provide a media distortion result.

As mentioned above with reference to FIG. 4, the SSD method may be used to determine a media distortion result for each of the bit rate options. The bitrate option with the lowest media distortion result is then selected as the bitrate option for rendering. The SSD method penalizes for larger values and therefore provides a larger media distortion result for larger variations in media distortion and similarly a smaller media distortion result for smaller variation in media distortion. In the example of FIG. 5, the media distortion result based on the sum of squared differences is equal to $D1^2+D2^2+D3^2$. Another method that could be used to determine the media distortion results with smoothing variations in distortion is to calculate a standard deviation of the values (e.g., a standard deviation of the value D1, D2, and D3). The media distortion result is then equal to an average (e.g., an average of the values D1, D2, and D3) plus one standard deviation from the average (e.g., plus one standard deviation of the value D1, D2, and D3 from the average of the values D1, D2, and D3).

A third method includes evaluating a cost function to determine a cost (the media distortion result) for each of the bitrate options includes considering buffer depletion. The cost or media distortion result based on the example of FIG. 5 may be calculated as follows based on smoothing a variation in distortion and an adjustment for buffer depletion using the following formula:

$$(D1^2+\lambda \cdot BD1)+(D2^2+\lambda \cdot BD2)+(D3^2+\lambda \cdot BD3)$$

where $\lambda$ is a Lagrange multiplier, which is tuned according to the implementation and is probably dependent on buffer size and therefore is determined based on experiments. The above formula may be evaluated for each of the bitrate options yielding a plurality of costs or media distortion results. A lowest cost or media distortion result is selected from the plurality of media distortion results for rendering over the timeslots. The above formula attempts to reduce media distortion (with smoothing the variation in media distortion over each time slot), if the buffer depletion cost is "reasonable". The "reasonable" consideration is handled by the Lagrange multiplier, which is adjusted according to the implementation based on some experimentation. It will be appreciated that the media distortion result may be calculated for two timeslots or more than three timeslots by adjusting the number of terms in the above formula.

In accordance with an alternative embodiment of the present disclosure, the media distortion result may be determined using the SAD method with an adjustment for buffer depletion, based on the following formula:

$$\text{SAD (of } D1, D2 \text{ and } D3) + \lambda \cdot BD1 + \lambda \cdot BD2 + \lambda \cdot BD3$$

In accordance with an alternative embodiment of the present disclosure, the media distortion result may be determined using the average method with an adjustment for buffer depletion, based on the following formula:

$$\text{Average (of } D1, D2 \text{ and } D3) + \lambda \cdot BD1 + \lambda \cdot BD2 + \lambda \cdot BD3$$

In accordance with an alternative embodiment of the present disclosure, the media distortion result may be determined using the average method plus one standard deviation with an adjustment for buffer depletion, based on the following formula:

$$\text{Average (of } D1, D2 \text{ and } D3) + 1 \text{ standard deviation} \\ \text{(of } D1, D2 \text{ and } D3) + \lambda \cdot BD1 + \lambda \cdot BD2 + \lambda \cdot BD3$$

In the above calculations, described herein with reference to FIGS. 4 and 5, results that are more accurate may be achieved when the timeslots are closer to being of equal length. Nevertheless, it will be appreciated that the above calculations may be performed even when the timeslots are of uneven length. By way of example, the cost or media distortion result based on the example of FIG. 5 may be calculated as follows based on smoothing a variation in distortion and an adjustment for buffer depletion using the following formula:

$$a \cdot (D1^2 + \lambda \cdot BD1) + b \cdot (D2^2 + \lambda \cdot BD2) + c \cdot (D3^2 + \lambda \cdot BD3)$$

where a, b, and c are the relative time durations of the timeslots 1, 2 and 3, respectively.

Figure 6:
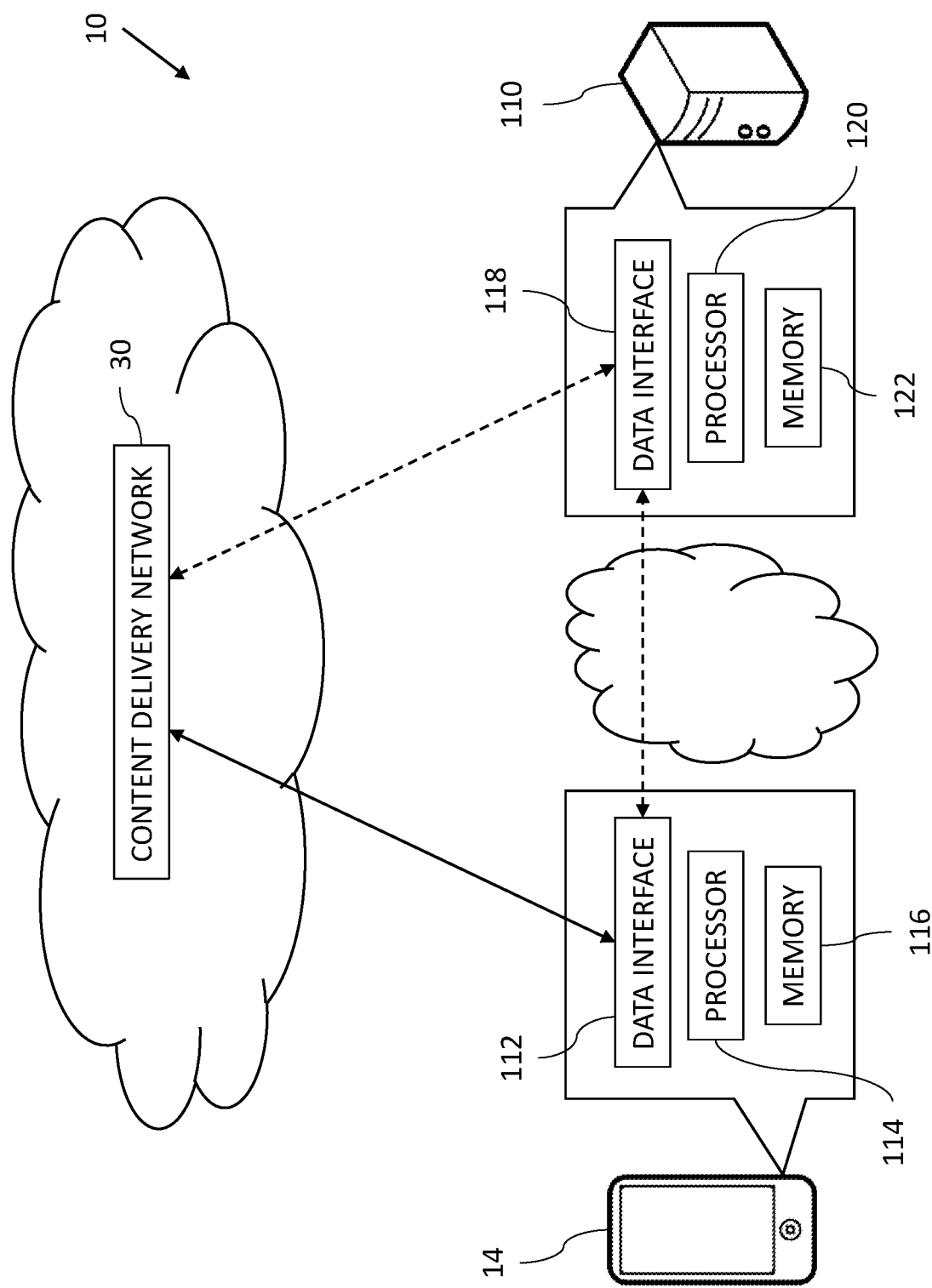
FIG. 6 is a more detailed block diagram view of the media delivery system of FIG. 1.

Reference is now made to FIG. 6, which is a more detailed block diagram view of the media delivery system 10 of FIG. 1. Determining the bitrate options, calculating the media distortion results, and selecting the bitrate option with a lowest media distortion result, may be performed by the client device 14 or by a server 110 external to the client device 14. The server 110 may form part of the content delivery network 30 or may be external to the content delivery network 30. The client device 14 includes a data interface 112, a processor 114, and a memory 116. The server 110 includes a data interface 118, a processor 120, and a memory 122.

Information about the future location of the client device 14 and the predicted future available network bandwidth might be determined by the server 110 or by the client device 14. If the information is determined by the server 110, then the information is typically made available by the server 110 (e.g., on demand) and/or downloaded for local storage by the client device 14, for example so that the information is locally available even in case of a small temporary loss of network access. The information could be transmitted to the client device 14 in several ways, but it is appreciated that Extensible Messaging and Presence Protocol (XMPP) would be a convenient way, by way of example only, as it would enable the information to be pushed to the client device 14. On the client device 14, a resident service may locally re-expose (through system application program interfaces (APIs), or a Hypertext Transfer Protocol (HTTP) local service, by way of example only) the information which has been transmitted to the client device 14 from the server.

The client device 14 has been described herein by way of a mobile client device. However, it will be appreciated that the media delivery system 10 may be implemented even if the client device is a non-mobile device or is a mobile device, which is at present stationary.

Reference is now made to FIG. 7, which is a flow chart 124 showing exemplary steps in a method of bitrate stream selection in the system 10 of FIG. 1. The method described with reference to FIG. 7 is performed by the server 110 of FIG. 6. The processor 120 (FIG. 6) of the server 110 is operative to determine (block 126) future locations of the client device 14 (FIG. 6) as described above. The processor 120 is operative to determine (block 128) predicted future available network bandwidth, which is available to the client device 14. The predicted future available network bandwidth might be based on predicted future bandwidth in a plurality of different regions in which the client device 14 is predicted to be located during a plurality of future successive timeslots.

As mentioned above with reference to FIG. 6, determining the bitrate options, calculating the media distortion results and selecting the bitrate option with a lowest media distortion result may be performed by the client device 14 or by a server 110. The description below, with reference to FIG. 7 assumes that the server 110 is performing the steps of determining the bitrate options, calculating the media distortion results, and selecting the bitrate option with a lowest media distortion result.

The processor 120 is operative to determine (block 130) a plurality of bitrate options for downloading video content to the client device 14 and rendering by the client device 14 over a plurality of future successive timeslots. The video content is encoded as a plurality of bitrate streams. Each bitrate stream is encoded at a different bitrate and is associated with a media distortion value. Each bitrate option of the plurality of bitrate options includes a different selection from the plurality of bitrate streams for rendering by the client device 14 over the plurality of timeslots so that the plurality of bitrate options include different combinations of the plurality of bitrate streams for rendering by the client device 14 over the plurality of future successive timeslots. Each bitrate option selects one bitrate stream from the plurality of bitrate streams for rendering by the client device 14 in each of the plurality of future successive timeslots. Two or more adjacent timeslots may include the same bitrate stream or different bitrate streams for rendering by the client device 14. At least one bitrate option includes a selection of different bitrate streams for rendering by the client device 14.

The processor 120 is operative to determine the bitrate options so that for each bitrate option the predicted future available network bandwidth supports downloading the bitrate streams of that bitrate option by the client device 14 in time for rendering the bitrate streams of that bitrate option according to the future successive timeslots.

The processor 120 is operative to determine the bitrate options so that each bitrate option fulfills the following conditions: a buffer level of a media buffer in which the bitrate streams of that bitrate option are downloaded will not rise above a maximum buffer level throughout the future successive timeslots; and the buffer level of the media buffer will not fall below a minimum buffer level throughout the future successive timeslots.

The processor 120 is operative to select (block 132) one bitrate option, from the plurality of bitrate options yielding a selected bitrate option, to provide: a lowest media distortion result across the future successive timeslots; or a lowest media distortion result across the plurality of future successive timeslots subject to at least one other constraint (e.g., smoothing and or buffer depletion). The step of block 132 is described in more detail with reference to FIG. 9. The processor 120 is operative to send (block 134) the selected bitrate option to the client device 14 via the data interface 118 for the client device 14 to download at least part of one of the bitrate streams of the selected bitrate option.

Reference is now made to FIG. 8, which is a flow chart 136 showing exemplary steps in an alternative method of bitrate stream selection in the system 10 of FIG. 1. The steps described below assume that the client device 14 is performing the steps of determining the bitrate options, calculating the media distortion results and selecting the bitrate option with a lowest media distortion result. The processor 114 is operative to receive, from the server 110 (FIG. 6), via the data interface 112 (FIG. 6) of the client device 14 (FIG. 6), or the processor 114 (FIG. 6) of the client device 14 is operative to determine (block 138), data about predicted future available network bandwidth. The processor 114 is operative to receive, from the server 110 (FIG. 6), via the data interface 112 (FIG. 6) of the client device 14 (FIG. 6), or the processor 114 (FIG. 6) of the client device 14 is operative to determine (block 140), data about future locations of the client device 14. The processor 114 is operative to determine (block 142) the bitrate options. The processor 114 is operative to select (block 144) one bitrate option, from the plurality of bitrate options yielding a selected bitrate option, to provide: a lowest media distortion result across the future successive timeslots; or a lowest media distortion result across the plurality of future successive timeslots subject to at least one other constraint (e.g., smoothing and or buffer depletion). The step of block 144 is described in more detail with reference to FIG. 9. The processor 114 is operative to download (block 146) at least part of one of the bitrate streams of the selected bitrate option via the data interface 112.

Figure 9:
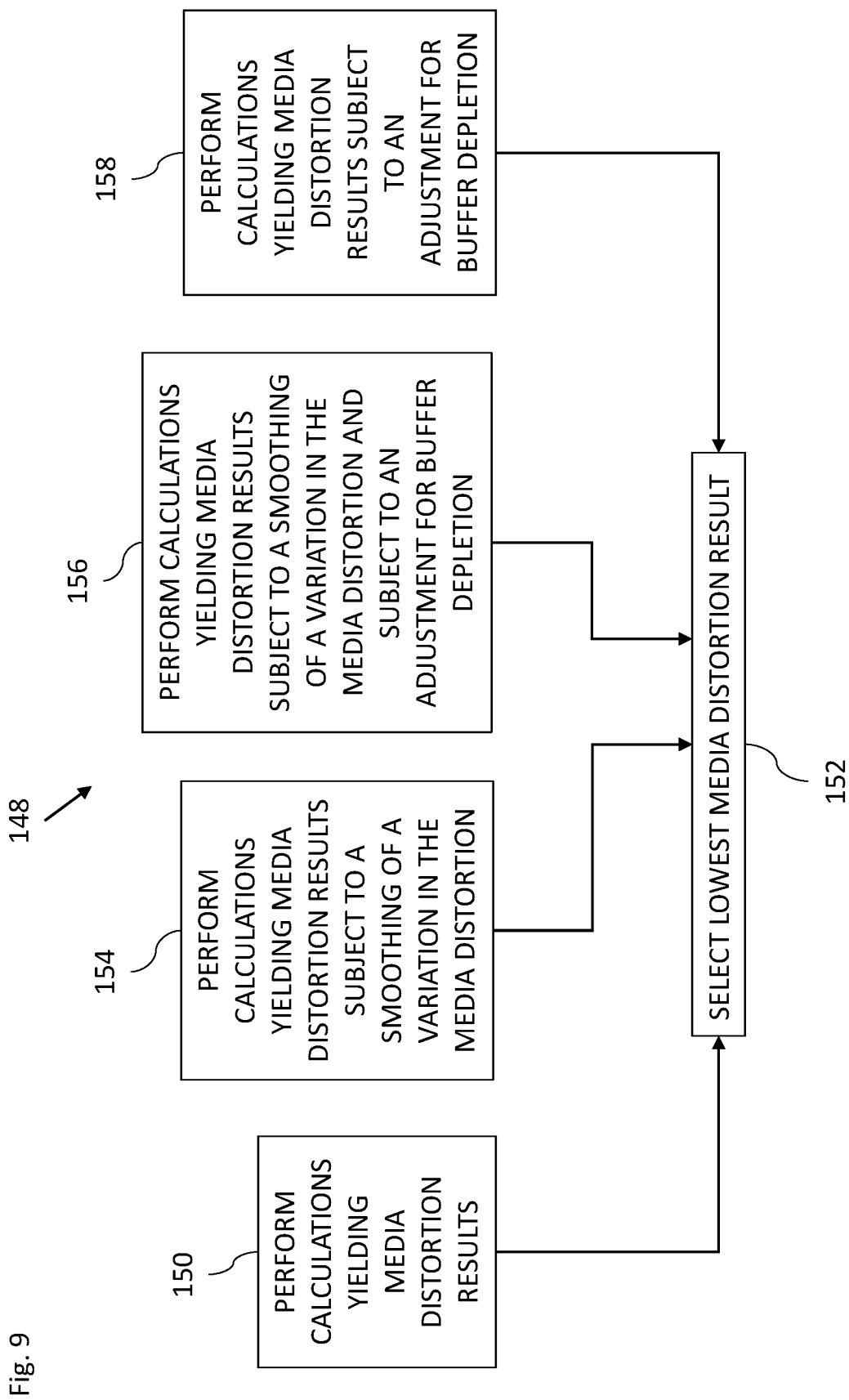
FIG. 9 is a flow chart showing optional exemplary steps in the methods of FIGS. 7 and 8.

Reference is now made to FIG. 9, which is a flow chart 148 showing optional exemplary steps in the methods of FIGS. 7 and 8. The step 132 of FIG. 7 and the step 144 of FIG. 8 may comprise the steps in any of the following alternative embodiments described below.

In accordance with a first embodiment of the present disclosure, the processor 114, 120 is operative to perform calculations (block 150) yielding a media distortion result for each bit rate option. The calculation method may include SAD or average by way of example only. The processor 114, 120 is operative to select (block 152) one of the bitrate options having a lowest media distortion result of the plurality of media distortion results.

In accordance with a second embodiment of the present disclosure, the processor 114, 120 is operative to perform calculations (block 154) yielding a media distortion result subject to smoothing of a variation in the media distortion for each bit rate option. For each bitrate option, the processor 114, 120 may be operative to perform a calculation including summing the squares of the media distortion values, or summing the square of values based on the media distortion values, of the bitrate streams selected for that one bitrate option, yielding the media distortion result for that bitrate option. Alternatively, the processor 114, 120 may be operative to perform a calculation, for each bitrate option, including summing an average and one standard deviation of the media distortion values from the average, of the bitrate streams selected for that one bitrate option, yielding the media distortion result for that bitrate option. The processor 114, 120 is operative to select (block 152) one of the bitrate options having a lowest media distortion result of the plurality of media distortion results. Therefore, in accordance with the second embodiment of the present disclosure, the processor 114, 120 is operative to select one bitrate option, from the plurality of bitrate options, yielding the selected bitrate option, to provide a lowest media distortion result across the plurality of future successive timeslots subject to smoothing a variation in the media distortion of the bit rate streams across the plurality of future successive timeslots.

In accordance with a third embodiment of the present disclosure, the processor 114, 120 is operative to perform calculations (block 156) yielding a media distortion result subject to smoothing of a variation in the media distortion for each bit rate option and subject to an adjustment for buffer depletion. For each bitrate option, the processor 114, 120 is operative to perform a calculation including summing the squares of the media distortion values, or square of values based on the media distortion values, of the bitrate streams selected for that bitrate option plus an adjustment for buffer depletion in each of the future successive timeslots, yielding a media distortion result for that bitrate option. Alternatively, the processor 114, 120 may be operative to perform a calculation, for each bitrate option, including summing an average and one standard deviation of the media distortion values from the average, of the bitrate streams selected for that one bitrate option, plus an adjustment for buffer depletion in each of the future successive timeslots, yielding the media distortion result for that bitrate option. The processor 114, 120 is operative to select (block 152) one of the bitrate options having a lowest media distortion result of the plurality of media distortion results. Therefore, in accordance with the third embodiment of the present disclosure, the processor 114, 120 is operative to select one bitrate option, from the plurality of bitrate options yielding the selected bitrate option, to provide a lowest media distortion result across the plurality of future successive timeslots subject to smoothing a variation in the media distortion of the bit rate streams across the plurality of future successive timeslots and subject to an adjustment for buffer depletion in each of the plurality of future successive timeslots.

In accordance with a fourth embodiment of the present disclosure, the processor 114, 120 is operative to perform calculations (block 158) yielding a media distortion result subject to an adjustment for buffer depletion. The calculation method may include SAD or average by way of example only with an adjustment for buffer depletion. The processor 114, 120 is operative to select (block 152) one of the bitrate options having a lowest media distortion result of the plurality of media distortion results.

In practice, some or all of the functions of the processor 114, 120 may be combined in a single physical component or, alternatively, implemented using multiple physical components. These physical components may comprise hardwired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. An apparatus comprising:
   a processor;
   a memory to store data used by the processor;
   a data interface for communications over a network;
   the processor being operative to:
      determine a plurality of bitrate options for downloading video content to a client device for rendering by the client device over a plurality of future successive timeslots, the video content being encoded as a plurality of bitrate streams, each one bitrate stream of the plurality of bitrate streams being encoded at a different bitrate and being associated with a media distortion value, each one bitrate option of the plurality of bitrate options including a different selection from the plurality of bitrate streams for rendering by the client device over the plurality of future successive timeslots so that the plurality of bitrate options include different combinations of the plurality of bitrate streams for rendering by the client device over the plurality of future successive timeslots, each one bitrate option of the plurality of bitrate options selecting one bitrate stream from the plurality of bitrate streams for rendering by the client device in each of the plurality of future successive timeslots such that two or more adjacent timeslots of the plurality of future successive timeslots includes a same one bitrate stream or different bitrate streams from the plurality of bitrate streams for rendering by the client device, at least one bitrate option of the plurality of bitrate options including a selection of different bitrate streams from the plurality of bitrate streams for rendering by the client device;
      select one bitrate option, from the plurality of bitrate options yielding a selected bitrate option, to provide: a lowest media distortion result across the plurality of future successive timeslots; or a lowest media distortion result across the plurality of future successive timeslots subject to at least one other constraint; and
      cause at least part of one bitrate stream of the plurality of bitrate streams of the selected bitrate option to be downloaded to the client device for rendering of the video content.

2. The apparatus according to claim 1, wherein:
   the apparatus is comprised in the client device; and the processor is operative to download at least part of one bitrate stream of the plurality of bitrate streams of the selected bitrate option via the data interface.

3. The apparatus according to claim 1, wherein:
the apparatus is comprised in a server external to the client device; and
the processor is operative to send the selected bitrate option to the client device via the data interface for the client device to download at least part of one bitrate stream of the plurality of bitrate streams of the selected bitrate option.

4. The apparatus according to claim 1, wherein the processor is operative to determine the plurality of bitrate options so that for each one bitrate option of the plurality of bitrate options a predicted future available network bandwidth supports downloading the bitrate streams of the one bitrate option by the client device in time for rendering the bitrate streams of the one bitrate option according to the plurality of future successive timeslots.

5. The apparatus according to claim 4, wherein the predicted future available network bandwidth is based on predicted future bandwidth in a plurality of different regions in which the client device is predicted to be located during the plurality of future successive timeslots.

6. The apparatus according to claim 4, wherein the processor is operative to determine the plurality of bitrate options so that each one bitrate option of the plurality of bitrate options fulfills the following:
a buffer level of a media buffer in which the bitrate streams of the one bitrate option are downloaded will not rise above a maximum buffer level throughout the plurality of future successive timeslots; and
the buffer level of the media buffer will not fall below a minimum buffer level throughout the plurality of future successive timeslots.

7. The apparatus according to claim 1, wherein the processor is operative to select the one bitrate option, from the plurality of bitrate options yielding the selected bitrate option, to provide: a lowest media distortion result across the plurality of future successive timeslots subject to smoothing a variation in a media distortion of the bitrate streams across the plurality of future successive timeslots; or a lowest media distortion result across the plurality of future successive timeslots subject to smoothing a variation in the media distortion of the bitrate streams across the plurality of future successive timeslots and subject to at least one other constraint.

8. The apparatus according to claim 7 wherein the processor is operative to:
for each one bitrate option of the plurality of bitrate options, perform a calculation including summing squares of the media distortion values, or square of values based on the media distortion values, of the bitrate streams selected for the one bitrate option, yielding a media distortion result for the one bitrate option; and
select the lowest media distortion result from the media distortion results of the bitrate options.

9. The apparatus according to claim 1 wherein the processor is operative to select the one bitrate option, from the plurality of bitrate options yielding the selected bitrate option, to provide: a lowest media distortion result across the plurality of future successive timeslots subject to smoothing a variation in a media distortion of the bitrate streams across the plurality of future successive timeslots and subject to an adjustment for buffer depletion in each of the plurality of future successive timeslots.

10. The apparatus according to claim 9, wherein the processor is operative to:
for each one bitrate option of the plurality of bitrate options, perform a calculation including summing squares of the media distortion values, or square of values based on the media distortion values, of the bitrate streams selected for the one bitrate option plus an adjustment for buffer depletion in each of the plurality of future successive timeslots, yielding a media distortion result for the one bitrate option; and
select the lowest media distortion result from the media distortion results of the bitrate options.

11. A computer program product comprising a non-transitory computer-readable storage media having software stored therein that, when executed by a processor, controls the processor to perform steps of:
determining a plurality of bitrate options for downloading video content to a client device for rendering by the client device over a plurality of future successive timeslots, the video content being encoded as a plurality of bitrate streams, each one bitrate stream of the plurality of bitrate streams being encoded at a different bitrate and being associated with a media distortion value, each one bitrate option of the plurality of bitrate options including a different selection from the plurality of bitrate streams for rendering by the client device over the plurality of future successive timeslots so that the plurality of bitrate options include different combinations of the plurality of bitrate streams for rendering by the client device over the plurality of future successive timeslots, each one bitrate option of the plurality of bitrate options selecting one bitrate stream from the plurality of bitrate streams for rendering by the client device in each of the plurality of future successive timeslots such that two or more adjacent timeslots of the plurality of future successive timeslots includes a same one bitrate stream or different bitrate streams from the plurality of bitrate streams for rendering by the client device, at least one bitrate option of the plurality of bitrate options including a selection of different bitrate streams from the plurality of bitrate streams for rendering by the client device;
selecting one bitrate option, from the plurality of bitrate options yielding a selected bitrate option, to provide: a lowest media distortion result across the plurality of future successive timeslots; or a lowest media distortion result across the plurality of future successive timeslots subject to at least one other constraint; and
causing at least part of one bitrate stream of the plurality of bitrate streams of the selected bitrate option to be downloaded to the client device for rendering of the video content.

12. The computer program product according to claim 11, wherein the computer program product resides in the client device which includes the processor and a data interface, and the software is executable to control the processor to perform the further step of downloading at least part of one of the bitrate streams of the plurality of bitrate streams of the selected bitrate option via the data interface.

13. The computer program product according to claim 11, wherein the computer program product resides in a server which includes the processor and a data interface, and the software is executable to control the processor to perform the further step of sending the selected bitrate option to the client device via the data interface for the client device to download at least part of one of the bitrate streams of the plurality of bitrate streams of the selected bitrate option.

14. The computer program product according to claim 11, wherein the software is executable to control the processor to perform the determining the plurality of bitrate options so that for each one bitrate option of the plurality of bitrate options a predicted future available network bandwidth supports downloading the bitrate streams of the one bitrate option by the client device in time for rendering the bitrate streams of the one bitrate option according to the plurality of future successive timeslots.

15. The computer program product according to claim 14, wherein the predicted future available network bandwidth is based on predicted future bandwidth in a plurality of different regions in which the client device is predicted to be located during the plurality of future successive timeslots.

16. The computer program product according to claim 14, wherein the software is executable to control the processor to perform the determining the plurality of bitrate options so that each one bitrate option of the plurality of bitrate options fulfills the following:
   a buffer level of a media buffer in which the bitrate streams of the one bitrate option are downloaded will not rise above a maximum buffer level throughout the plurality of future successive timeslots; and
   the buffer level of the media buffer will not fall below a minimum buffer level throughout the plurality of future successive timeslots.

17. The computer program product according to claim 11, wherein the software is executable to control the processor to perform the selecting the one bitrate option, from the plurality of bitrate options yielding the selected bitrate option, to provide: a lowest media distortion result across the plurality of future successive timeslots subject to smoothing a variation in a media distortion of the bitrate streams across the plurality of future successive timeslots; or a lowest media distortion result across the plurality of future successive timeslots subject to smoothing a variation in the media distortion of the bitrate streams across the plurality of future successive timeslots and subject to at least one other constraint.

18. The computer program product according to claim 17, wherein the software is executable to control the processor to further perform:
   for each one bitrate option of the plurality of bitrate options, performing a calculation including summing squares of the media distortion values, or square of values based on the media distortion values, of the bitrate streams selected for the one bitrate option, yielding a media distortion result for the one bitrate option; and
   selecting the lowest media distortion result from the media distortion results of the bitrate options.

19. The computer program product according to claim 11, wherein the software is executable to control the processor to further perform selecting the one bitrate option, from the plurality of bitrate options yielding the selected bitrate option, to provide: a lowest media distortion result across the plurality of future successive timeslots subject to smoothing a variation in a media distortion of the bitrate streams across the plurality of future successive timeslots and subject to an adjustment for buffer depletion in each of the plurality of future successive timeslots.

20. A computer program product comprising a non-transitory computer-readable storage media having software stored therein that, when executed by a processor, control the processor to perform steps of:
   determining a plurality of bitrate options for downloading video content to a client device for rendering by the client device over a plurality of future successive timeslots, the video content being encoded as a plurality of bitrate streams, each one bitrate stream of the plurality of bitrate streams being encoded at a different bitrate and being associated with a media distortion value, each one bitrate option of the plurality of bitrate options including a different selection from the plurality of bitrate streams for rendering by the client device over the plurality of future successive timeslots so that the plurality of bitrate options include different combinations of the plurality of bitrate streams for rendering by the client device over the plurality of future successive timeslots, each one bitrate option of the plurality of bitrate options selecting one bitrate stream from the plurality of bitrate streams for rendering by the client device in each of the plurality of future successive timeslots such that two or more adjacent timeslots of the plurality of future successive timeslots includes a same one bitrate stream or different bitrate streams from the plurality of bitrate streams for rendering by the client device, at least one bitrate option of the plurality of bitrate options including a selection of different bitrate streams from the plurality of bitrate streams for rendering by the client device;
   selecting one bitrate option, from the plurality of bitrate options yielding a selected bitrate option, to provide: a lowest media distortion result across the plurality of future successive timeslots; or a lowest media distortion result across the plurality of future successive timeslots subject to at least one other constraint; and
   sending the selected bitrate option to the client device for the client device to download at least part of one bitrate stream of the plurality of bitrate streams of the selected bitrate option.

* * * * *